United States Patent
Fick

(10) Patent No.: US 7,578,261 B2
(45) Date of Patent: Aug. 25, 2009

(54) PET WATER OR FOOD STORAGE UNIT WITH STOWABLE BOWL

(75) Inventor: Orval Lee Fick, Miami, OK (US)

(73) Assignee: Bergan, LLC, Miami, OK (US)

(*) Notice: Subject to any disclaimer, the term of this patent is extended or adjusted under 35 U.S.C. 154(b) by 0 days.

(21) Appl. No.: 11/164,642

(22) Filed: Nov. 30, 2005

(65) Prior Publication Data

US 2007/0119378 A1    May 31, 2007

(51) Int. Cl.
*A01K 61/02* (2006.01)
*B65D 51/18* (2006.01)

(52) U.S. Cl. .................... 119/52.1; 119/51.01

(58) Field of Classification Search .......... 222/535, 222/181.1, 452; 119/61.56, 52.1, 57, 900, 119/51.5, 63; 220/253, 825, 525; D30/129, D30/130, 131, 132, 133; D20/7
See application file for complete search history.

(56) References Cited

U.S. PATENT DOCUMENTS

| | | | |
|---|---|---|---|
| 468,870 A * | 2/1892 | Griswold | 222/533 |
| 1,832,999 A * | 11/1931 | Rummell | 119/52.1 |
| 2,321,856 A * | 6/1943 | Read | 209/255 |
| 2,534,444 A | 12/1950 | Hedwall et al. | |
| 2,659,344 A | 11/1953 | Herbert | |
| 2,943,600 A * | 7/1960 | Rosoff | 119/464 |
| 3,164,302 A * | 1/1965 | Indjian | 4/227.1 |
| 3,188,157 A | 6/1965 | Rand | |
| 3,191,818 A * | 6/1965 | Farquhar et al. | 222/457 |
| D233,895 S | 12/1974 | Mineo | |
| 3,985,104 A * | 10/1976 | Klemer | 119/51.12 |
| 4,000,719 A | 1/1977 | Richards | |
| 4,841,913 A * | 6/1989 | Forrer | 119/51.12 |
| 4,947,796 A | 8/1990 | Robinette | |
| D335,242 S * | 5/1993 | Saunders | D7/589 |
| D335,939 S | 5/1993 | Cooper | |
| 5,404,838 A | 4/1995 | Khan | |
| 5,467,735 A | 11/1995 | Chrisco | |
| 5,564,362 A * | 10/1996 | Fiveash | 119/51.5 |
| 5,636,592 A * | 6/1997 | Wechsler | 119/52.1 |
| 6,055,932 A | 5/2000 | Weber | |
| 6,135,056 A * | 10/2000 | Kuo | 119/51.11 |
| 6,158,623 A * | 12/2000 | Benavides et al. | 222/129 |
| 6,390,341 B1 * | 5/2002 | Ohmi et al. | 222/536 |
| 6,487,987 B1 * | 12/2002 | Choi | 119/51.5 |
| 6,718,911 B2 * | 4/2004 | Greenberg | 119/51.5 |

(Continued)

*Primary Examiner*—Peter M. Poon
*Assistant Examiner*—Kristen C Hayes
(74) *Attorney, Agent, or Firm*—Fellers, Snider, Blankenship, Bailey & Tippens

(57) ABSTRACT

A pet sustenance device (30, 96) provided includes an upright container (32, 98) which holds a supply of pet sustenance, together with an underlying dish (34, 102). The dish (34, 102) is pivotally coupled to the associated container (32, 98) via connection structure (36, 104) permitting the dish (34, 102) to be selectively moved between a retracted position beneath the container (32, 98) and a pet-access position wherein the dish (34, 102) is pivoted away from the container (32, 98) and presents a sustenance cavity (90, 174). When the dish (34, 102) is in the swung-away pet-access position, the sustenance within the container (32, 98) flows under the influence of gravity into the dish (34, 102). The dish (34, 102) and container (32, 98) are configured to prevent communication therebetween when the dish (34, 102) is in the retracted position thereof.

20 Claims, 17 Drawing Sheets

U.S. PATENT DOCUMENTS

| | | | |
|---|---|---|---|
| 6,843,205 B1 * | 1/2005 | Segreto | 119/74 |
| 6,845,735 B1 * | 1/2005 | Northrop et al. | 119/52.1 |
| 6,863,025 B2 * | 3/2005 | Ness | 119/72 |
| 6,920,991 B2 * | 7/2005 | Holley, Jr. | 215/6 |
| 6,976,611 B2 * | 12/2005 | Lee | 222/536 |
| 7,284,499 B1 * | 10/2007 | Kuster et al. | 119/51.5 |
| 2004/0182326 A1 * | 9/2004 | Polimeni, Jr. | 119/51.5 |
| 2004/0188456 A1 * | 9/2004 | Arai et al. | 221/263 |

* cited by examiner

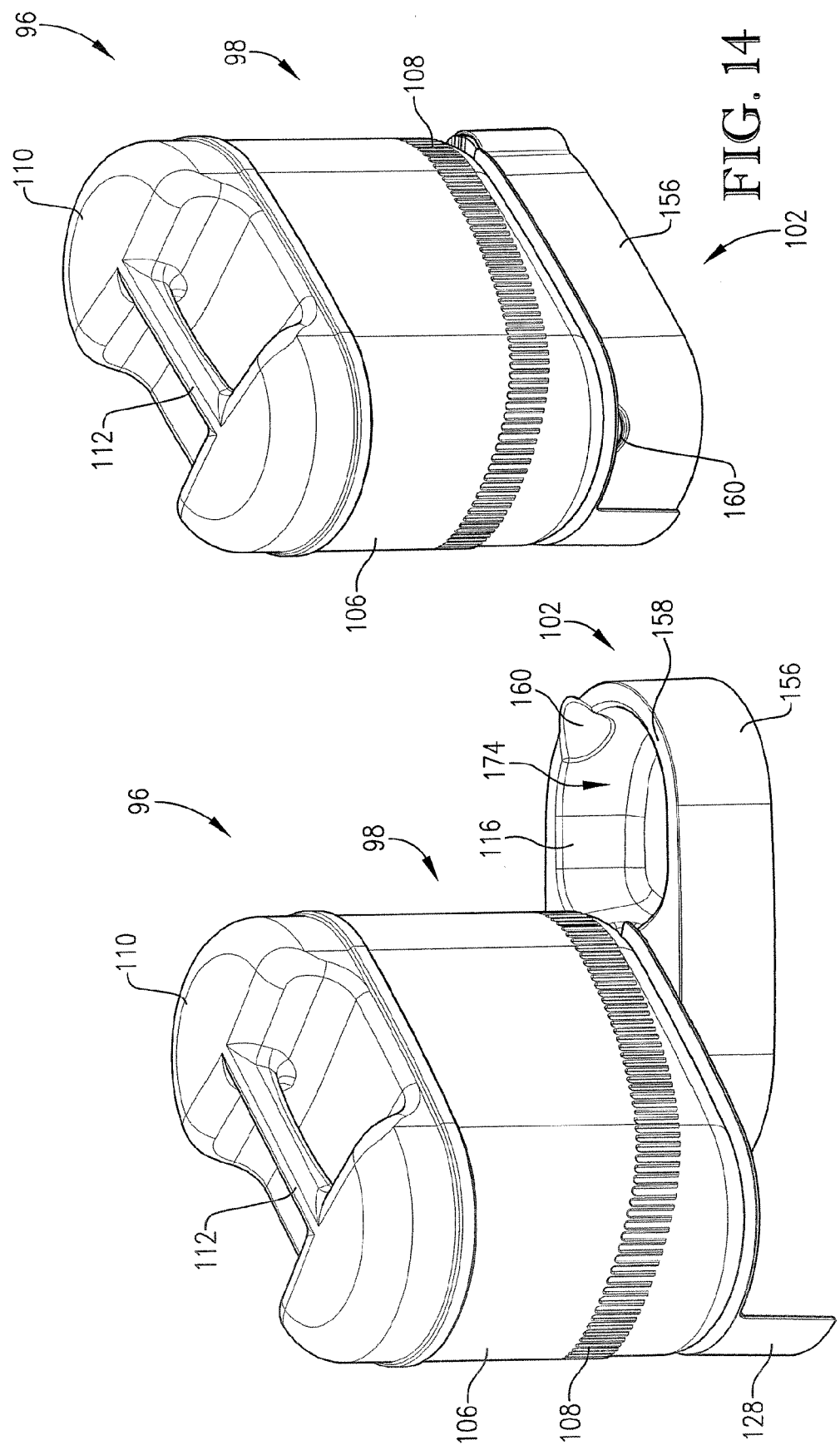

PET WATER OR FOOD STORAGE UNIT WITH STOWABLE BOWL

CROSS REFERENCE TO RELATED APPLICATION

This application is being filed contemporaneously with application for U.S. Design patent Ser. No. 29/243,713, entitled PET WATER OR FOOD STORAGE UNIT WITH STOWABLE BOWL, which is hereby incorporated by reference herein.

BACKGROUND OF THE INVENTION

1. Field of the Invention

The present invention is broadly concerned with portable devices for providing sustenance to pets while traveling. More particularly, the invention is directed to such devices for the feeding and watering of small household pets wherein the devices comprise an upper container for storing feed or water, with a lower stowable dish which can be moved from a retracted position beneath the container to an access position.

2. Description of the Prior Art

People traveling with pets must assure that the pet can be properly fed and watered during the trip. Traditionally, travelers have simply carried along food and water dishes along with supplies of food and water for the pet. From time to time, the dishes are filled and put out for the pet.

Such improvisations present a number of practical problems. First of all, the dishes must be stored in an auto or luggage, and can create a space problem. Moreover, carrying sacks of pet feed and containers of water exacerbates these difficulties, and spillage of the feed and water is a common occurrence.

A number of patents have attempted to address these issues. U.S. Pat. No. 2,659,344 discloses a circular enclosure device for pets including a primary body with a swinging door. A pet may rest within the body and is enclosed by the door. The door also carries a shelf supporting a pair of bowls for feeding/watering of the pet. A separate slide-out drawer is also provided for storage purposes. This device does little to overcome the problems of traveling with pets, inasmuch as the food and water must be carried and placed within the door-mounted bowls as needed.

U.S. Pat. No. 4,000,719 discloses an automatic pet food dispenser with an automated storage drum and associated tray. The storage drum has multiple bins defined by respective panels filled with pet food. The bins open a feed shoot as the drum rotates about a central hub. Food from an open bin thus drops into the tray, which slides between an open position and a stowed position. While this device allows timed feeding of a pet from the individual bins, it is not at all adapted for easy carrying and use while traveling. It also requires a power source which may be inconvenient or unavailable to a traveler.

Other patents of background interest include: U.S. Pat. Nos. 2,534,444, 3,188,157, D233,895, 4,947,796, D335,939, 5,404,838, 6,055,932, and 6,845,735.

Despite the variety of pet-feeding/watering devices of the prior art, the problem of providing a truly convenient, space-efficient, and traveler-friendly device for feeding and watering of pets has not been met.

SUMMARY OF THE INVENTION

The present invention overcomes the problems outlined above and provides improved devices for feeding and watering of pets, particularly when traveling.

According to one aspect of the present invention, a device for providing sustenance for pets comprises an upright sustenance container presenting a sustenance storage chamber and a lower outlet opening communicating with the chamber. The device further includes a pet dish moveably coupled with the container. In particular, the dish is moveable relative to the container between a retracted position where the dish is below the container and communication between the container outlet opening and the dish is prevented, and a pet-access position where the dish is moved outwardly relative to the container to establish communication between the container and dish and permit gravity-induced flow of sustenance from the container outlet opening and into the dish.

Another aspect of the present invention concerns a pet sustenance device comprising an upright sustenance container presenting a sustenance storage chamber and a lower outlet opening communicating with the chamber. The device further includes a pet dish moveably coupled with the container and having a base. The dish is moveable relative to the container between a retracted position where the dish is beneath the container and a pet-access position where the dish is moved outwardly relative to the container to permit a pet to consume the sustenance within the dish. The dish supports the container in both the retracted and pet-feeding positions, with the dish base serving as a bottom of the device.

Yet another aspect of the present invention concerns a pet sustenance device comprising an upright sustenance container presenting a sustenance storage chamber and a lower outlet opening communicating with the chamber. The container includes a circumscribing external sidewall. The device further includes a pet dish swingably coupled with the container and including an external sidewall. The dish is swingable relative to the container between a retracted position where the dish is beneath the container and a pet-access position where the dish is swung outwardly relative to the container to permit a pet to consume the sustenance within the dish. The container sidewall mates with the dish sidewall and cooperatively presents a generally flush outer side surface when the dish is in the retracted position thereof.

In this way, the device is space-efficient and presents a desirable aesthetic appearance. Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 13 is a perspective view of a pet-watering device, shown with the lower water dish in its pivoted, pet-watering position;

FIG. 14 is a perspective view of the pet-watering device similar to that of FIG. 13, but showing the lower water dish in its retracted position;

Figure 21:
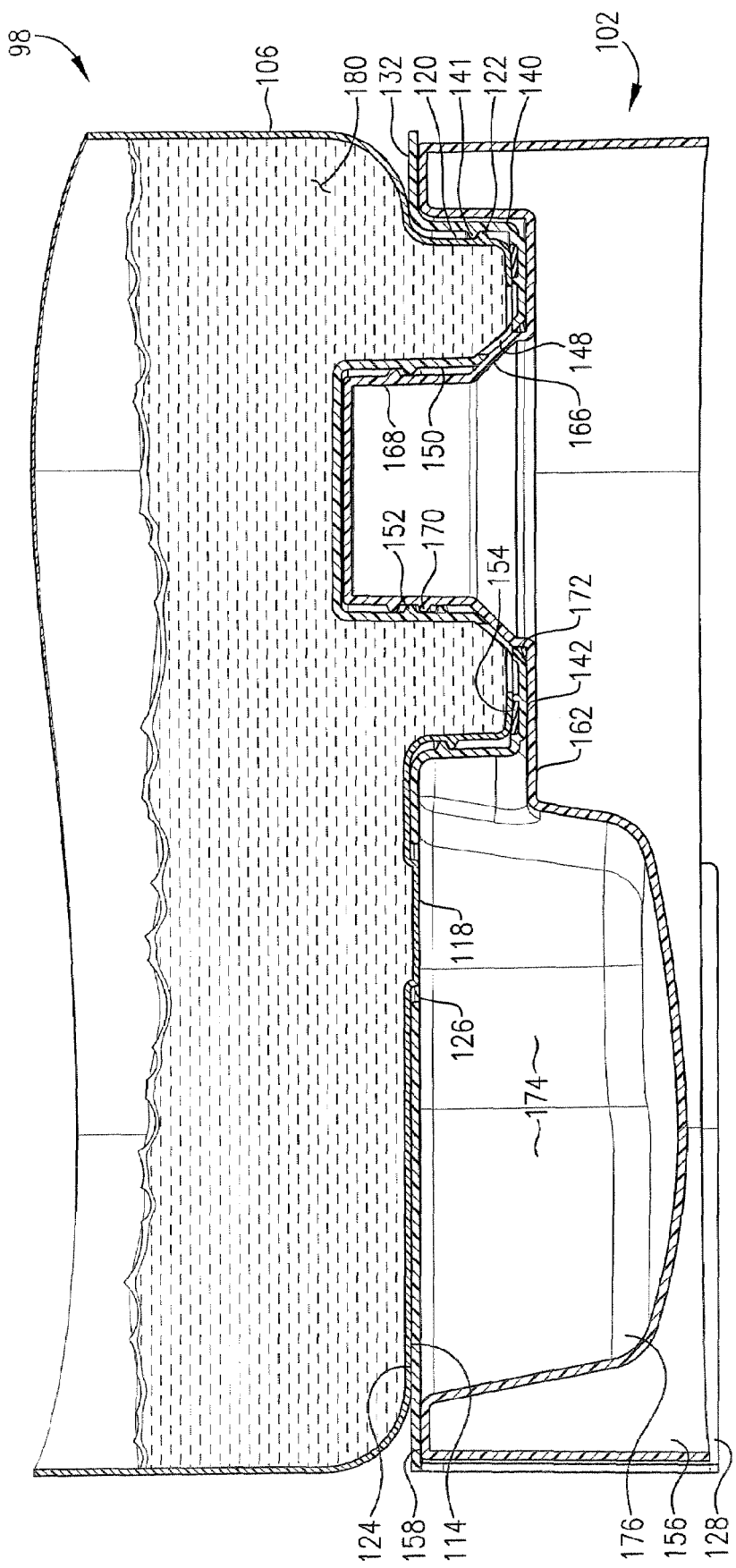
Figure 22:
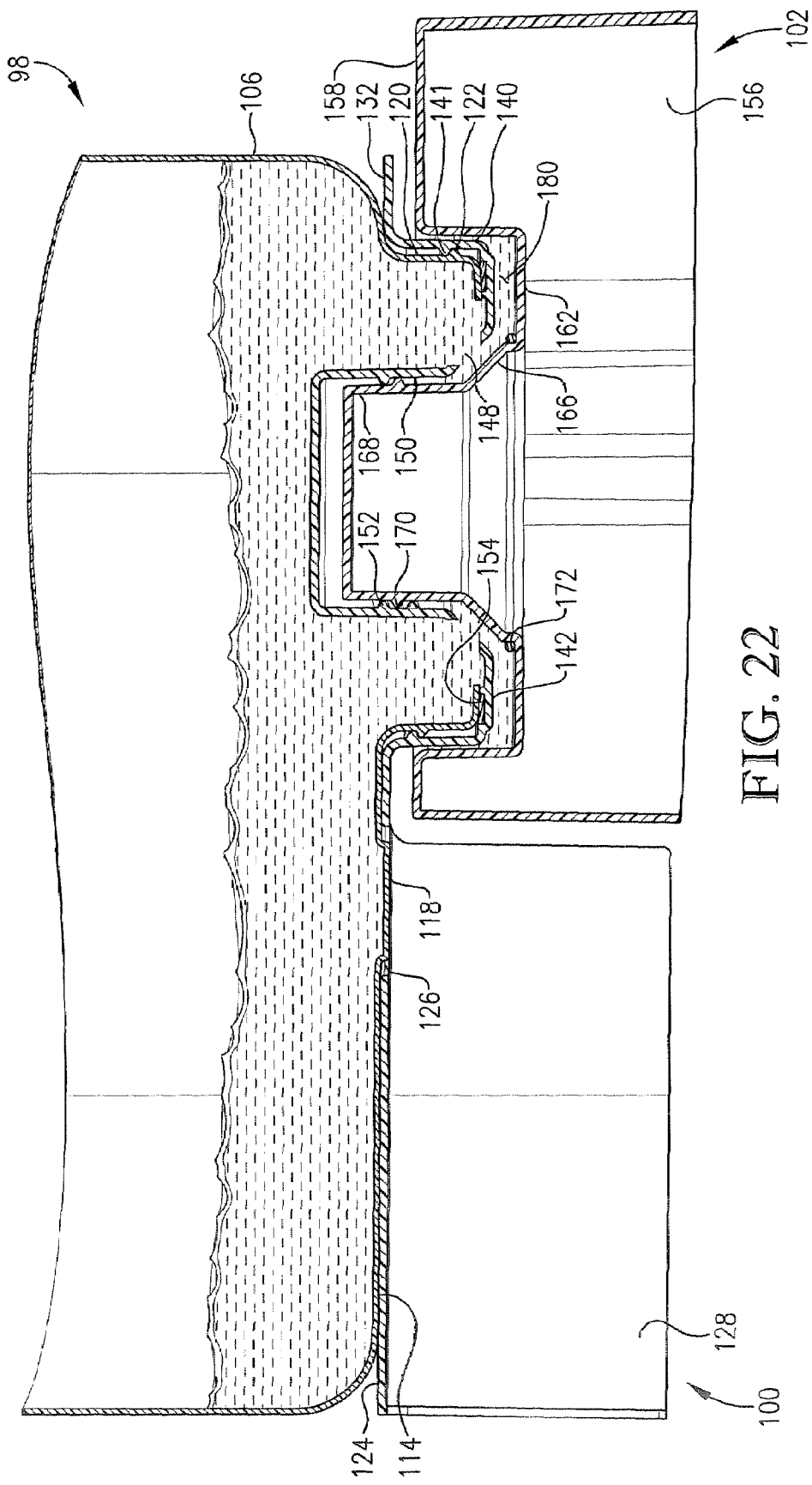

FIG. 21 is a fragmentary, vertical sectional view illustrating the pet-watering device depicted in FIG. 13, illustrating the bowl in the retracted position and the sealing arrangement preventing flow of water from the container; and FIG. 22 is a fragmentary, vertical sectional view of the pet-watering device similar to that of FIG. 21, but showing the dish in its pivoted, pet-watering position and the relationship of the components of the device permitting flow of water from the container into the dish.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENT

The Pet-Feeding Device of FIGS. 1-12

Figures 1, 2:
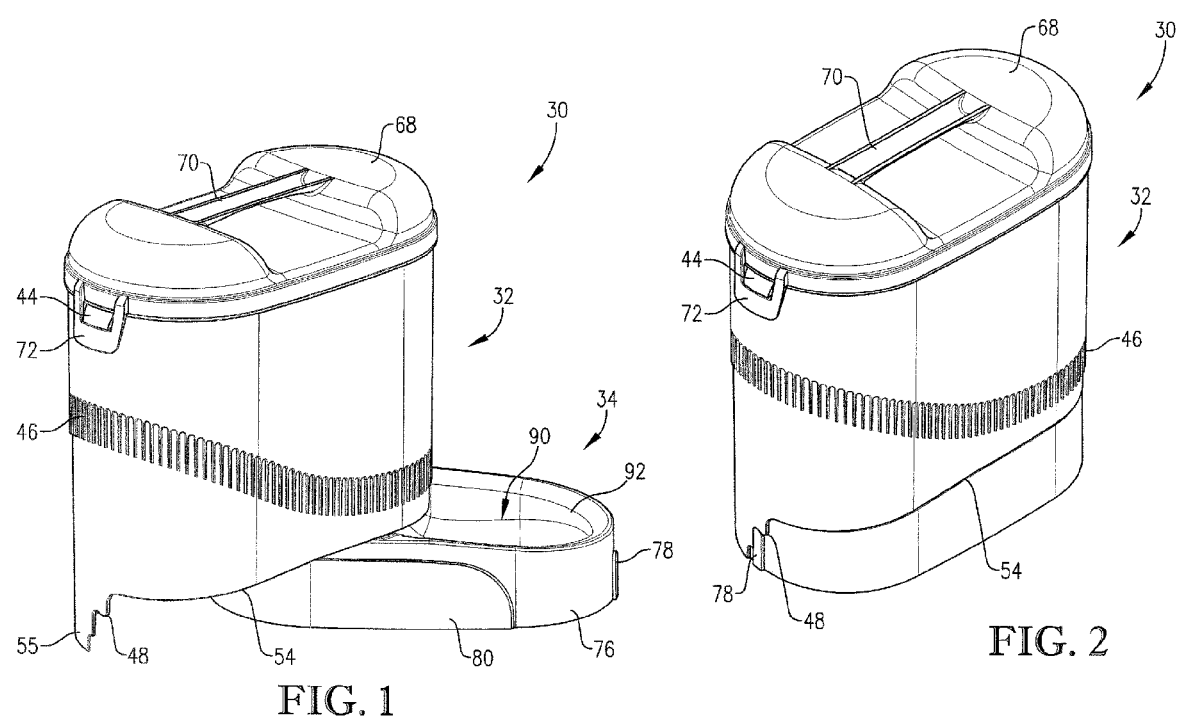
FIG. 1 is a perspective view of a pet-feeding device constructed in accordance with a preferred embodiment of the present invention, shown with the lower dish of the device in its pivoted, pet-feeding position.
FIG. 2 is a perspective view of the pet-feeding device similar to that of FIG. 1, but showing the lower dish in its retracted position.
Figure 3:
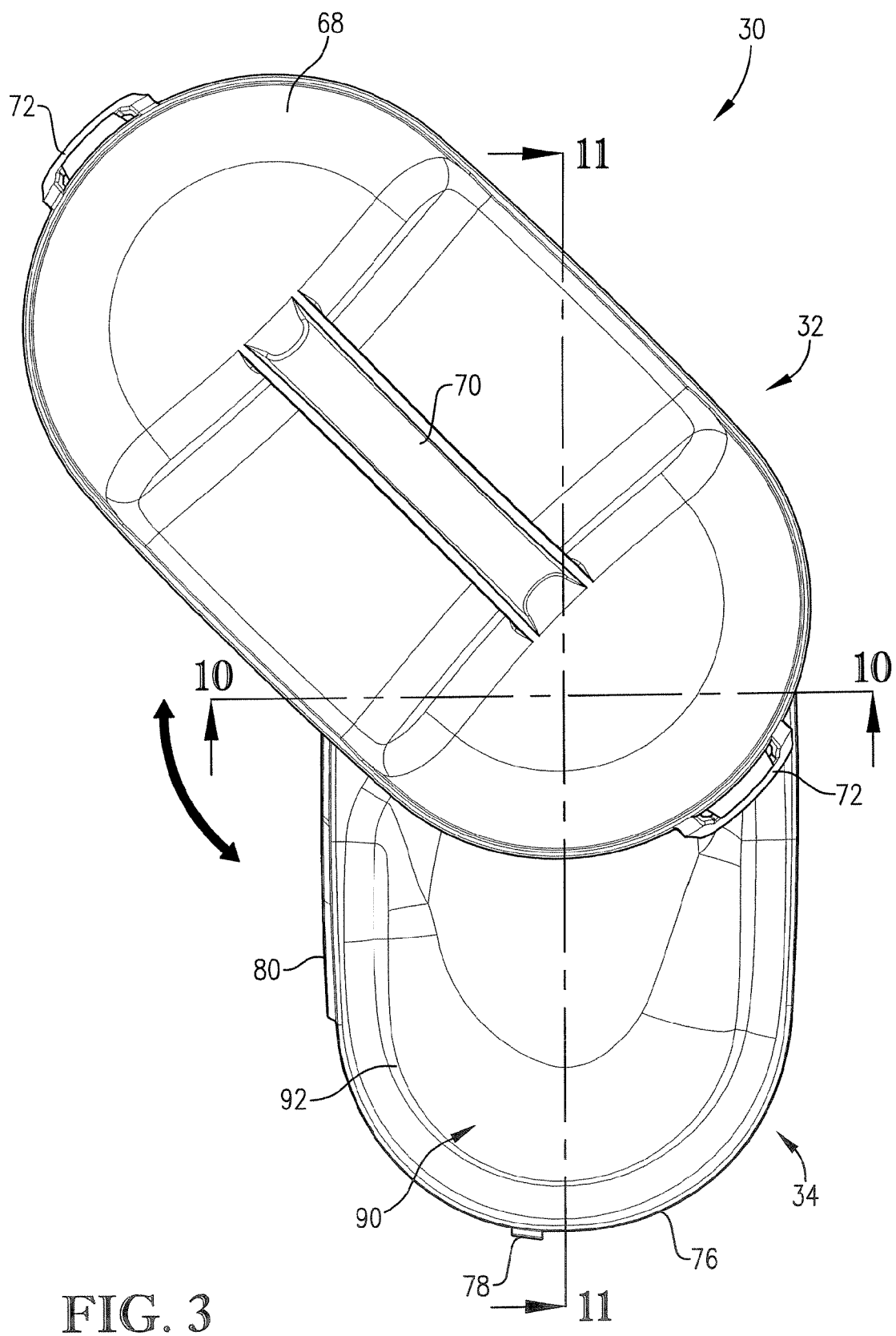
FIG. 3 is a plan view of the pet-feeding device depicted in FIG. 1.

Turning now to the drawings, a pet-feeding device 30 in accordance with a preferred embodiment of the present invention is illustrated in FIGS. 1-3. Broadly speaking, the device 30 includes an upper, hollow container 32 adapted to hold a dry, flowable pet food such as dog or cat kibbles, a lower swingable dish 34, and connection structure 36 operably coupling the container 32 and dish 34. The connection structure 36 preferably permits relative swinging movement such that the dish may assume a retracted position (FIG. 2) or a pivoted-away, pet-feeding position (FIG. 1). In the pet-feeding position, the device 30 is designed so that feed from the container 32 will descend under the influence of gravity into the dish 34 where the pet may consume the feed. Furthermore, the device 30 is designed to prevent flow from the container 32 into the dish 34 when the dish is in the retracted position.

In more detail, the container 32 (see FIGS. 4 and 7) includes an upright, substantially oval sidewall 38 presenting an upper lip 40 and a lower bottom edge 42. The sidewall 38 has a pair of end-mounted, integral clips 44 as well as decorative striations 46 on the outer surface thereof. The bottom edge 42 includes a scalloped end section 48, an arcuate relieved segment 50, a substantially semi-circular end segment 52 in opposed relationship to section 48 and terminating in a short upright stop wall 52a, and a final skirt section 54 opposed to the segment 50. It is noted that the sidewall presents an extension or leg 55 between the scalloped end section 48 and arcuate relieved segment 50, with the leg 55 extending to the bottom of the device 30 (or dish 34). The leg 55 serves to provide support for the container 32, particularly when the dish 34 is in the pet-access position.

Figure 5:
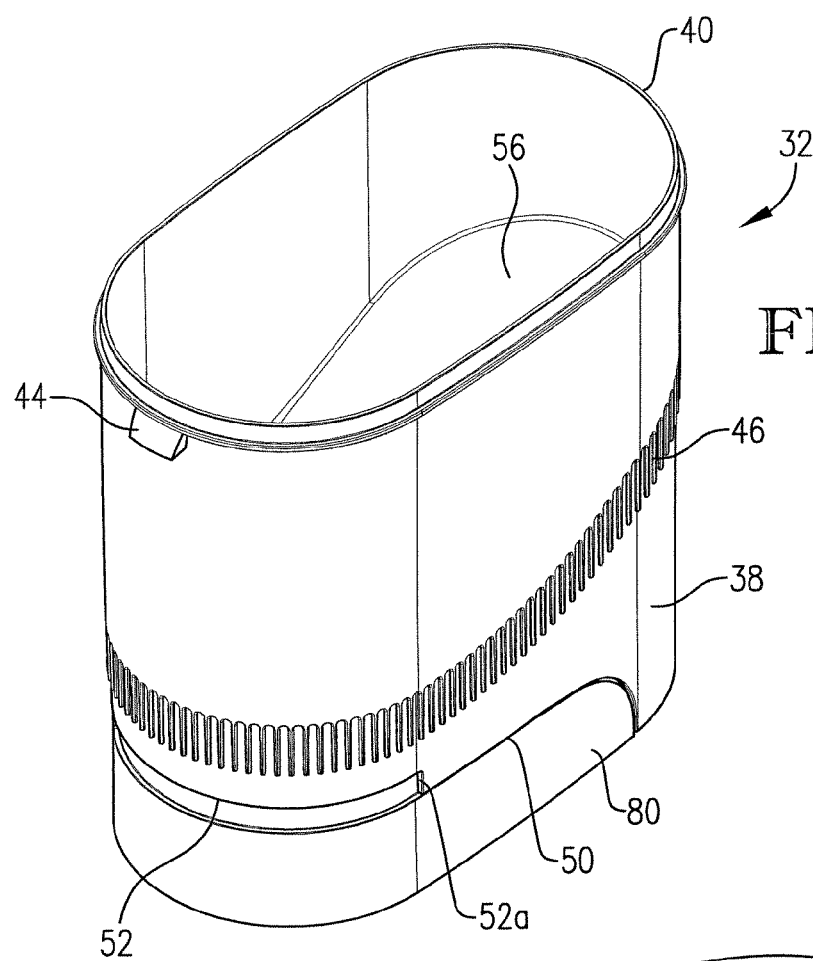
FIG. 5 is a perspective view of the pet-feeding device, illustrating the device with the cover removed to illustrate internal details.
Figure 12:
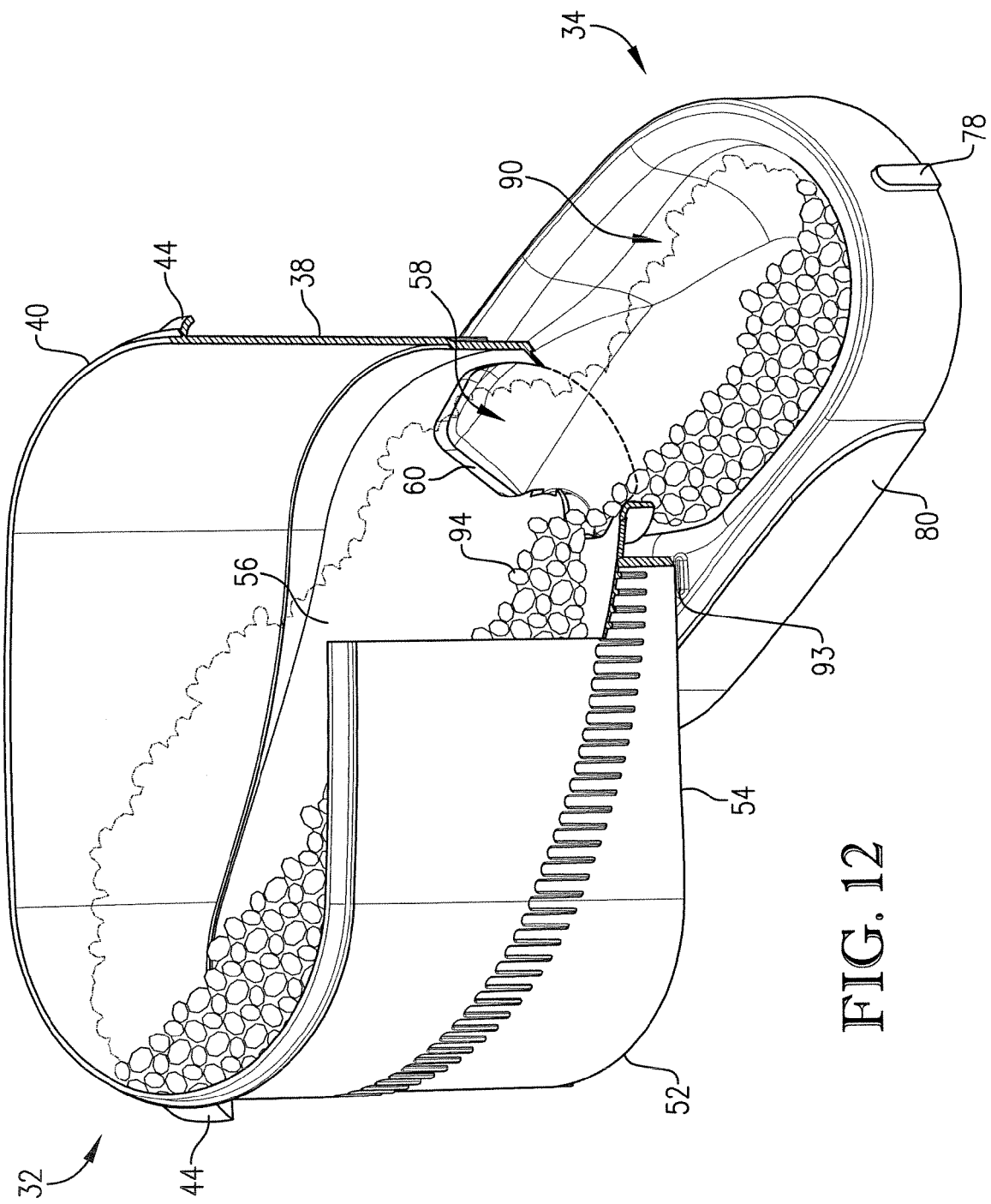
FIG. 12 is a fragmentary perspective view of the pet-feeding device depicted in FIG. 1, showing the dish in its pivoted, pet-feeding position and also illustrating the flow of pet food from the container into the dish.

The container 32 is also provided with an interior, sloped bottom wall 56 (see FIG. 7) presenting an outlet opening 58 adjacent the end segment 52. The opening 58 is bounded by the segment 52 as well as depending arcuate wall 60. A substantially circular boss 62 extends downwardly from bottom wall 56 and has a pair of elongated, opposed connection fingers 64 each having a lowermost, outwardly-projecting locking nib 66. A reinforcing wall 67 extends from boss 62 to the container sidewall 38. As best seen in FIGS. 5 and 12, the bottom wall 56 is sloped towards outlet opening 58 to facilitate passage of feed from the container to the underlying dish 34.

The container 32 is also equipped with a removable cover 68 having a central handle 70 and a pair of end-mounted latches 72. The bottom margin 74 of the cover 68 is designed to mate with container upper lip 40 to allow seating of the cover in place on the container. The latches 72 are designed to snap into place beneath the clips 44, thereby affording a secure, releasable connection between the cover and container.

Figure 4:
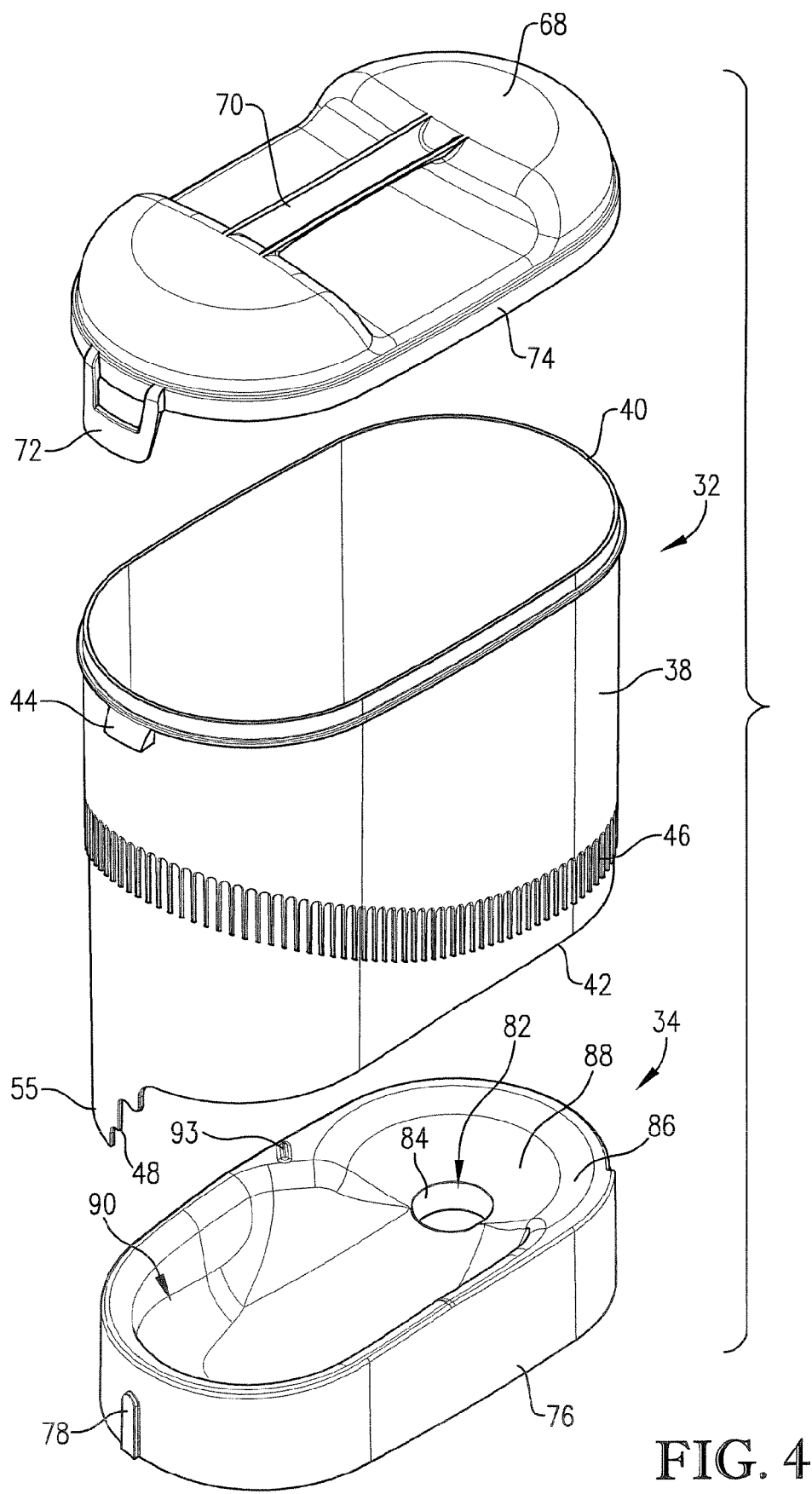
FIG. 4 is an exploded perspective view of the pet-feeding device of FIG. 1.
Figure 6:
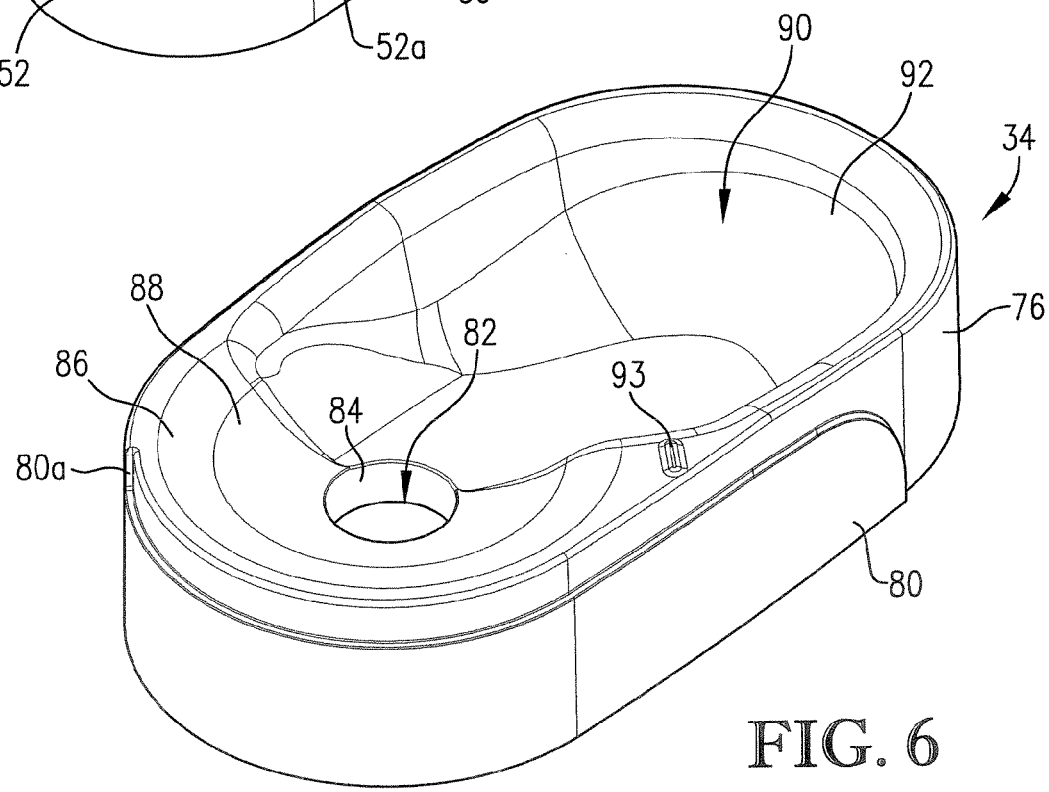
FIG. 6 is an enlarged perspective view of the dish forming a part of the pet-feeding device depicted in FIG. 1.
Figure 7:
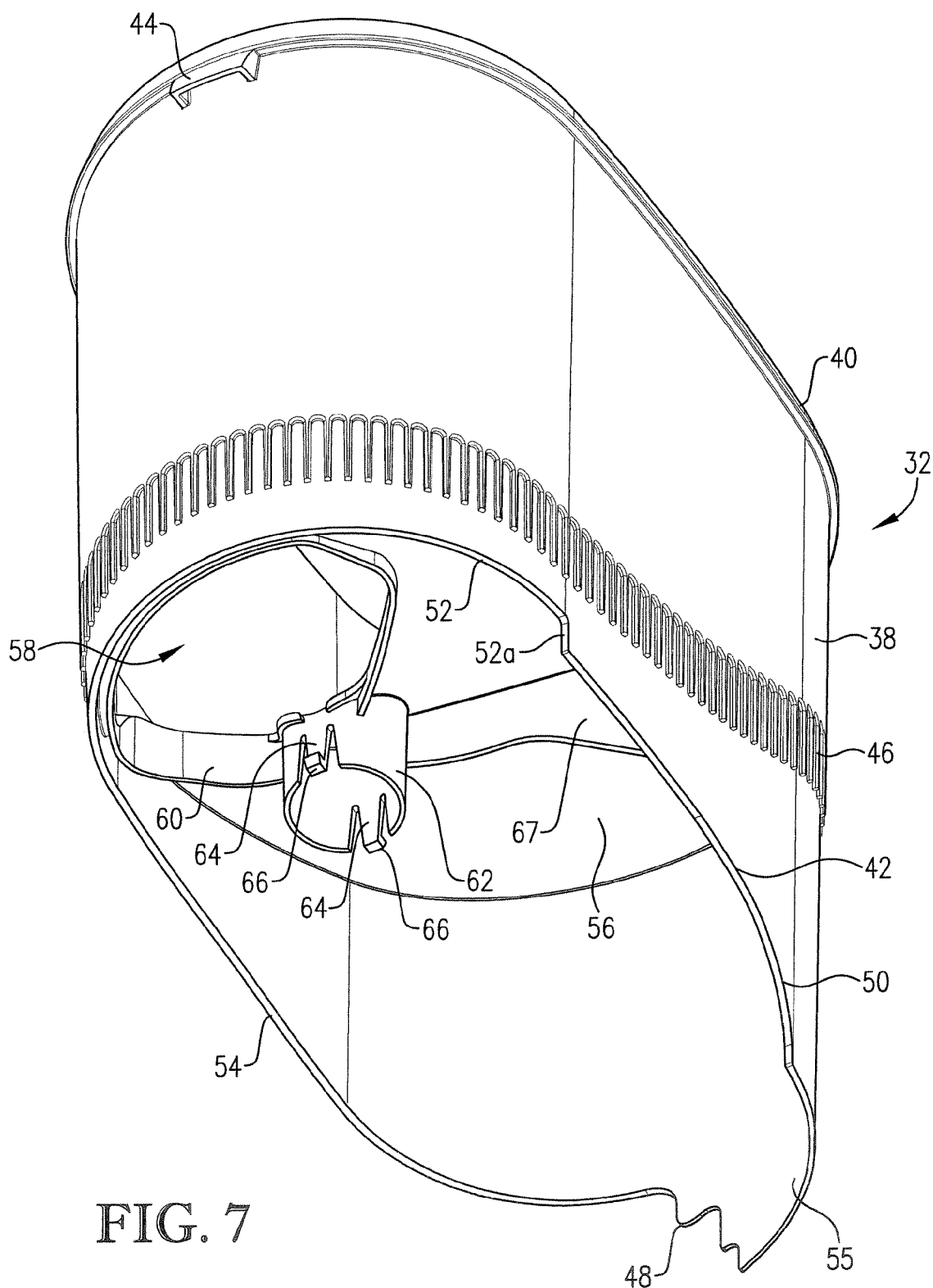
FIG. 7 is a perspective view of the container forming a part of the pet-feeding device depicted in FIG. 1, viewing the container from below and illustrating the outlet opening of the container.

As perhaps best shown in FIGS. 4 and 6, the dish 34 includes an upstanding, continuous, substantially oval-shaped sidewall 76 defining the base of the dish. The exterior sidewall 76 has a vertically oriented, outwardly-extending stop 78 as well as an outwardly-extending, arcuate fill section 80 along one side thereof, terminating in a short, upstanding stop wall 80a. Additionally, the dish has a substantially circular socket 82 presenting a downwardly-extending, defining sidewall 84. Referring to FIG. 4, it will be seen that the dish has a generally horizontal, arcuate wall segment 86 adjacent the end thereof opposed to the stop 78, which extends about socket 82. A sloped wall 88 extends from the inner margin of wall 86 downwardly to a lowermost cavity 90 which holds a supply of feed. The cavity 90 is defined by wall structure 92 which extends from the upper margin of sidewall 76 as shown. An upstanding stop 93 projects from the upper margin of the sidewall 76 to limit relative movement between the container 32 and dish 34, more specifically to prevent swinging of the dish 34 beyond the pet-access position (see FIGS. 4 and 6). In particular, as perhaps best shown in FIG. 12, the stop 93 is configured to engage the skirt 54 of the container bottom edge 42 when the dish 34 is swung to the pet-access position thereof.

Figure 9:
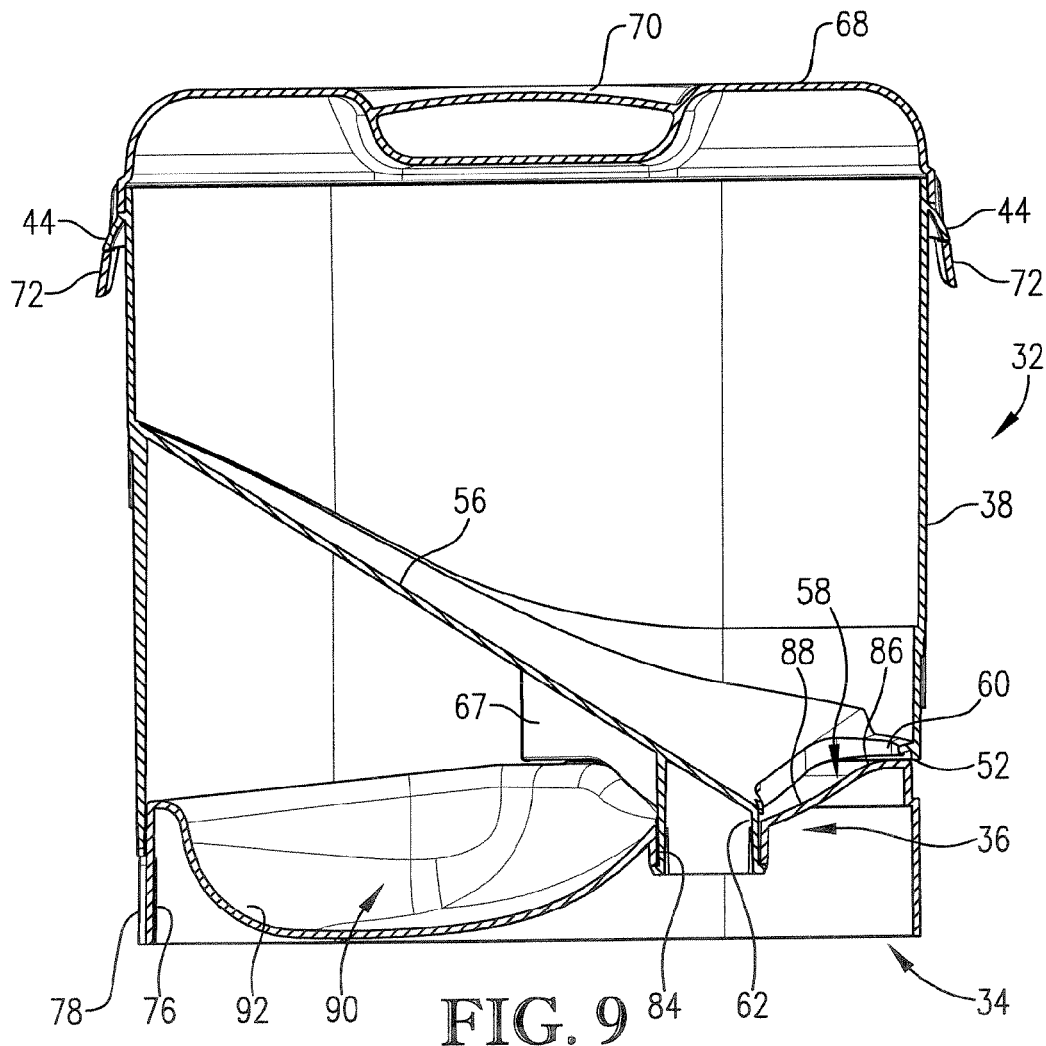
FIG. 9 is a vertical sectional view of the pet-feeding device taken along line 9-9 of FIG. 8.
Figure 10:
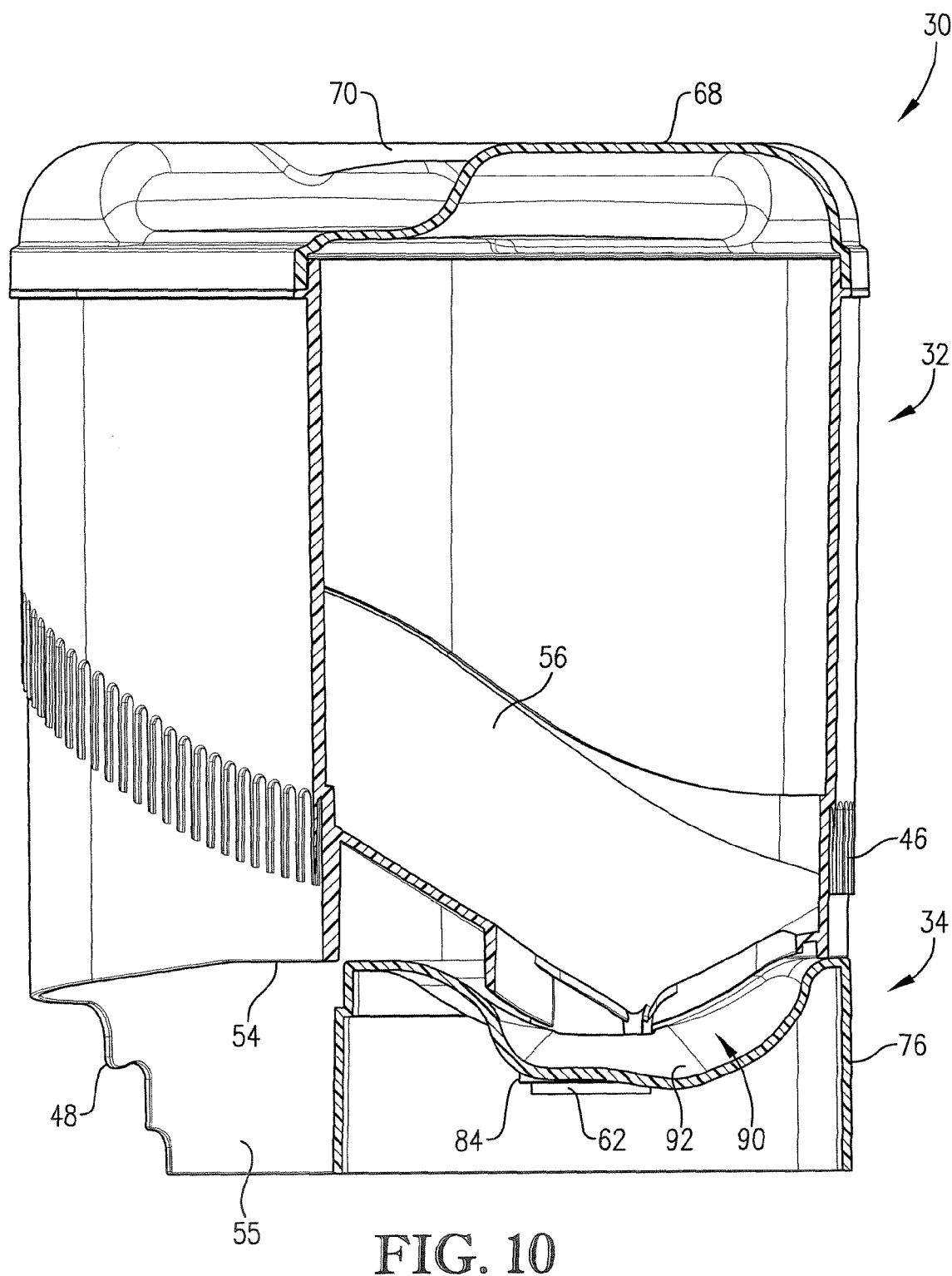
FIG. 10 is a vertical sectional view of the pet-feeding device taken along line 10-10 of FIG. 3.
Figure 11:
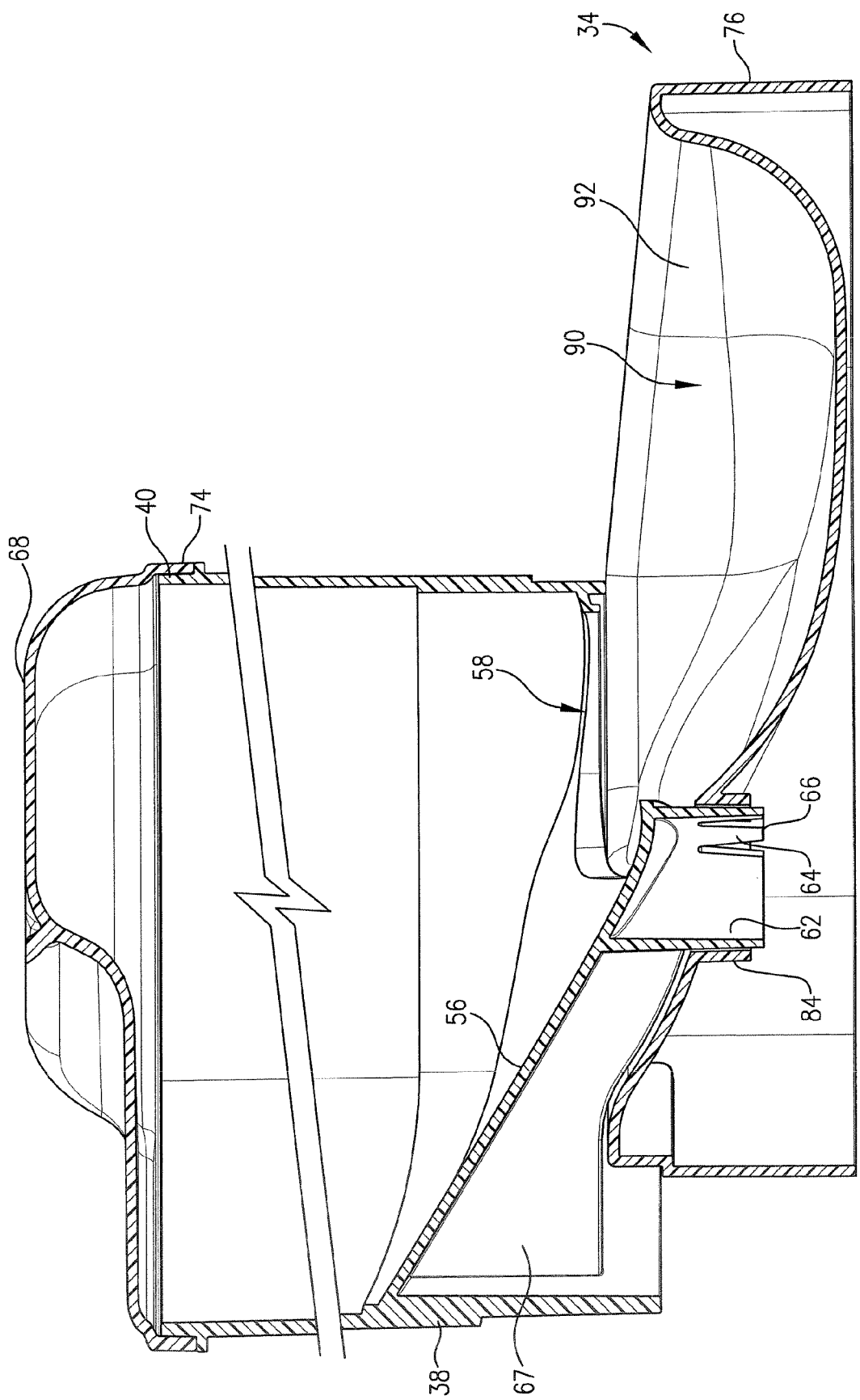
FIG. 11 is a vertical sectional view of the pet-feeding device taken along line 11-11 of FIG. 3.

The connection structure 36 is made up of the boss 62 of container 32 and socket 82 of dish 34. As best seen in FIGS. 9 and 11, the container 32 and dish 34 are swingably interconnected by insertion of boss 62 into socket 82 such that the nibs 66 of the respective fingers 64 engage the underside of socket-defining wall 84. In this manner, relative pivoting movement is afforded, allowing the dish 34 to be moved between its retracted and pet-feeding positions. It will be appreciated, however, that certain aspects of the present invention do not require the container 32 and dish 34 to be swingably interconnected; instead, other forms of relative movement (e.g., sliding movement) could be provided.

Figure 8:
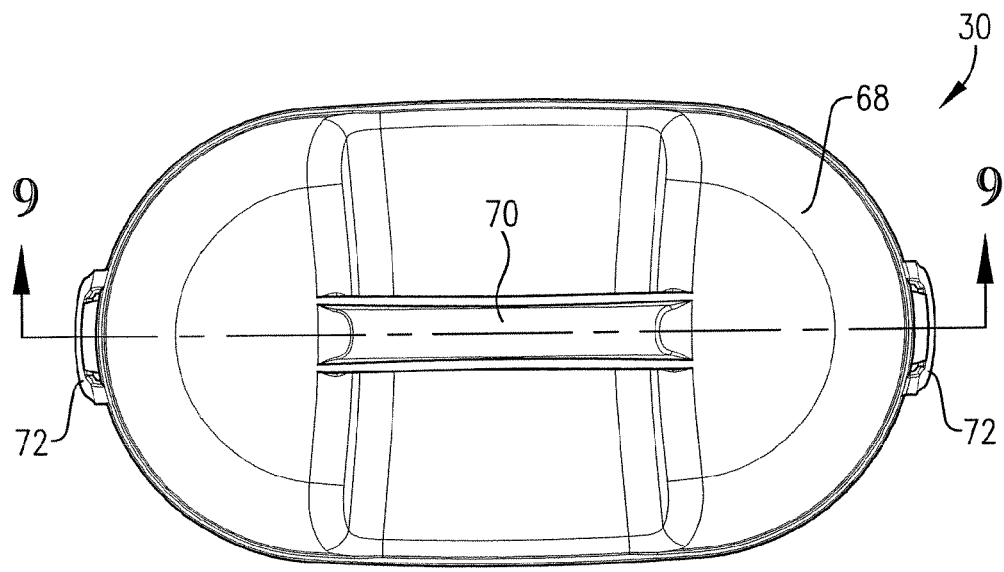
FIG. 8 is a plan view of the pet-feeding device depicted in FIG. 1, with the bowl in its retracted position.

Attention is next directed to FIGS. 2 and 8-9 which illustrate the device 30 in its retracted position. In this orientation, the dish 34 is swung generally beneath the container 32 such that stop 78 comes into abutting engagement with scalloped section 48 of the container bottom edge 42. Moreover, the fill section 80 mates with the relieved section 50 of the container bottom edge, as shown in FIG. 5. Similarly, the skirt section 54 of container bottom edge 42 is positioned atop and in substantial alignment with the edge of dish sidewall 76 opposite the fill section 80. Thus, in this retracted position, the device 30 presents a pleasing appearance with the respective visible (or outermost sections) of the sidewalls of the container 32 and dish 34 being in substantial vertical alignment. It will be noted that the preferred arrangement also includes overlapping portions of the sidewalls, which extend alongside one another and are vertically offset relative to one another (e.g., the leg 55 extending downwardly along the dish sidewall 76). In any case, the container and dish sidewalls mate with one another, in the sense that they have complemental interfitted portions which provide a curvilinear non-horizontal seam therebetween, and cooperatively present a generally flush outer side surface of the device 30.

It will also be observed that when the device 30 is in its retracted position, the outlet opening 58 of container 32 is closed, thereby preventing flow of feed from the container into dish 34. This is best illustrated in FIG. 9 where will be seen that the walls 86 and 88 are in alignment with opening 58 and wall 60, thereby closing the opening 58.

When it is desired to use device 30 for feeding of a pet, it is only necessary to relatively move the container 32 and dish 34 until the device assumes the pet-feeding position of FIGS. 1, 3, and 10-12. For example, the user may grasp handle 70 while holding dish 34 stationary in order to rotate container 32 relative to the dish 34 until the device assumes the pet-feeding position (i.e., when the skirt portion 54 of container edge 42 engages the stop 93). In this fully rotated position, the stop wall 80a of the dish 34 comes into abutting contact with stop wall 52a of the container, which also serves to limit over-rotation of the dish 34 relative to the container 32. When the dish is so positioned, the opening 58 is moved out of alignment with the walls 86, 88, and over one end of the cavity 90. As such, feed 94 (FIG. 12) will flow under the influence of gravity from container 32, through opening 58, and into the confines of cavity 90. As such, a pet can access the feed 94 and consume it. Of course, after feeding, the above operation is reversed, such that the device 30 again assumes its retracted position.

The Pet-Watering Device of FIGS. 13-22

A pet-watering device 96 in accordance with a second preferred embodiment of the present invention includes a container 98 having an intermediate sealing device 100, watering dish 102, and connection structure 104 serving to couple the foregoing components. As in the case of the first embodiment, the device 96 is designed for travel with pets, and permits selective watering of the pet simply by moving (preferably swinging) the dish 102 to its pet-watering position. The device 96 has a number of similarities with the first embodiment, and the following description will focus primarily on the distinctions for the sake of brevity.

In more detail, the container 98 includes a unitary body presenting a generally oval upstanding sidewall 106 having decorative striations 108 thereon, with an integrated top 110 equipped with a carrying handle 112. The container 98 also has a bottom wall 114 presenting a tubular outlet 116 and a central detent 118. The outlet 116 includes a tubular wall 120 having a one-turn exterior thread 122. The unitary body of the container 98 essentially presents a compartment portion to which the sealing device 100 is secured.

Figure 16:
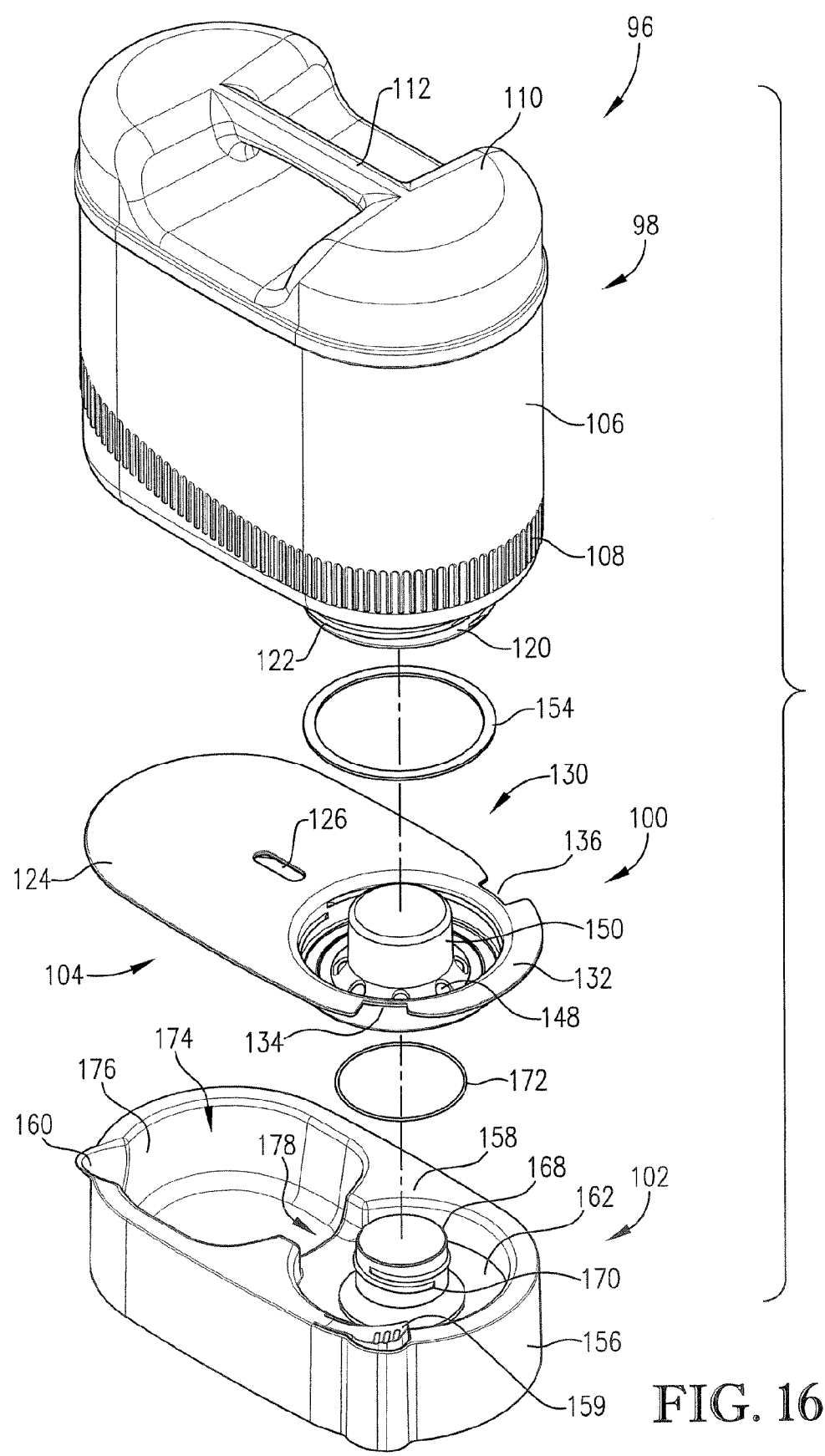
FIG. 16 is an exploded perspective view of the pet-watering device depicted in FIG. 13.
Figure 17:
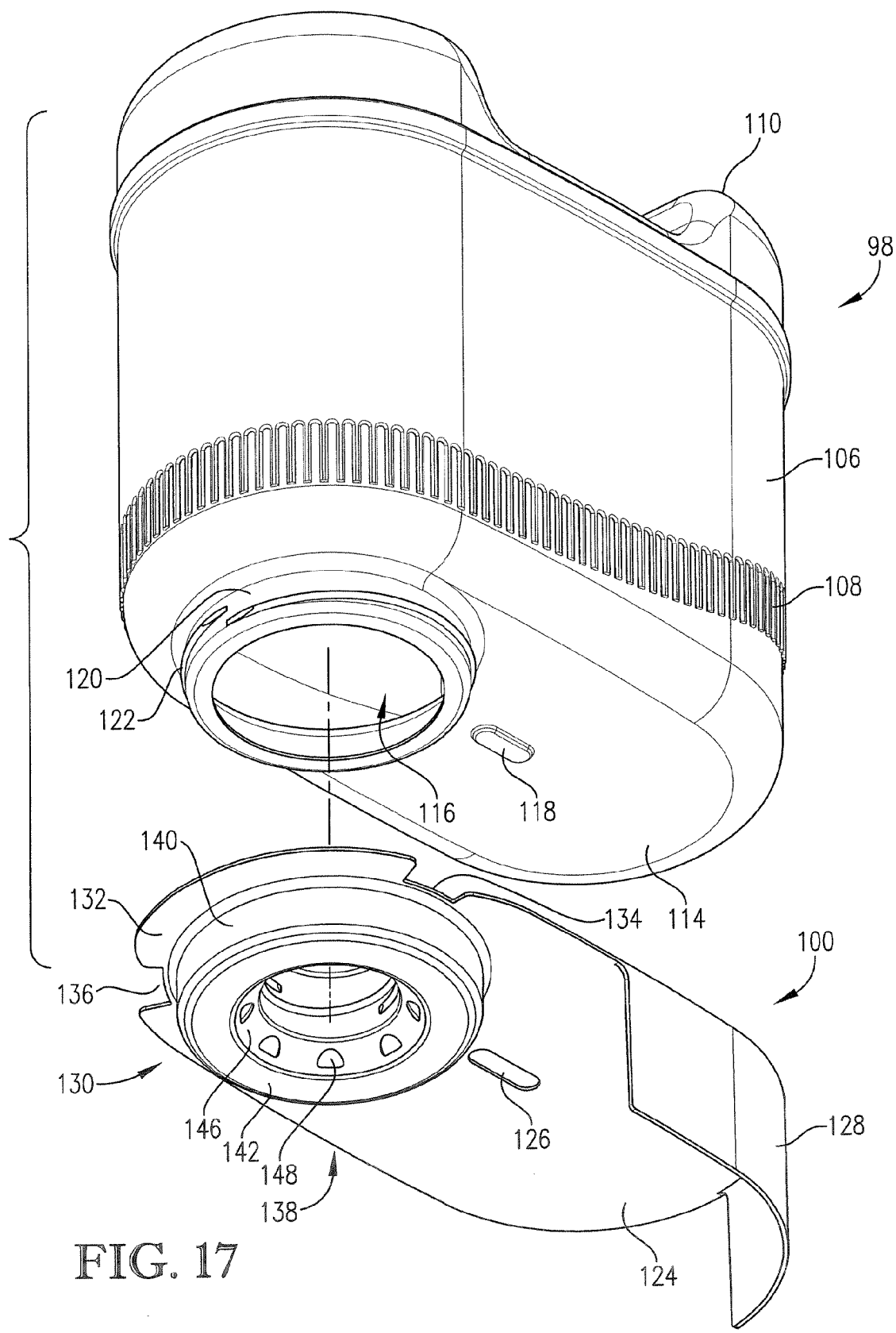
FIG. 17 is an exploded perspective view of the container and intermediate sealing element forming part of the pet-watering device depicted in FIG. 13.
Figure 18:
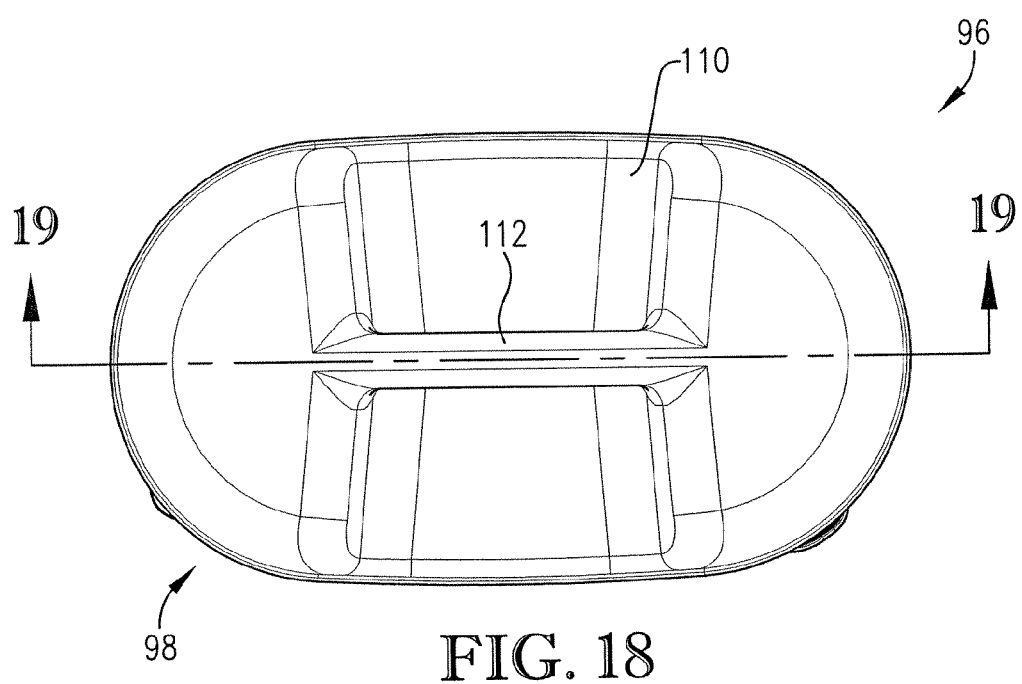
FIG. 18 is a plan view of the pet-watering device depicted in FIG. 13, with the bowl in the retracted position.
Figure 19:
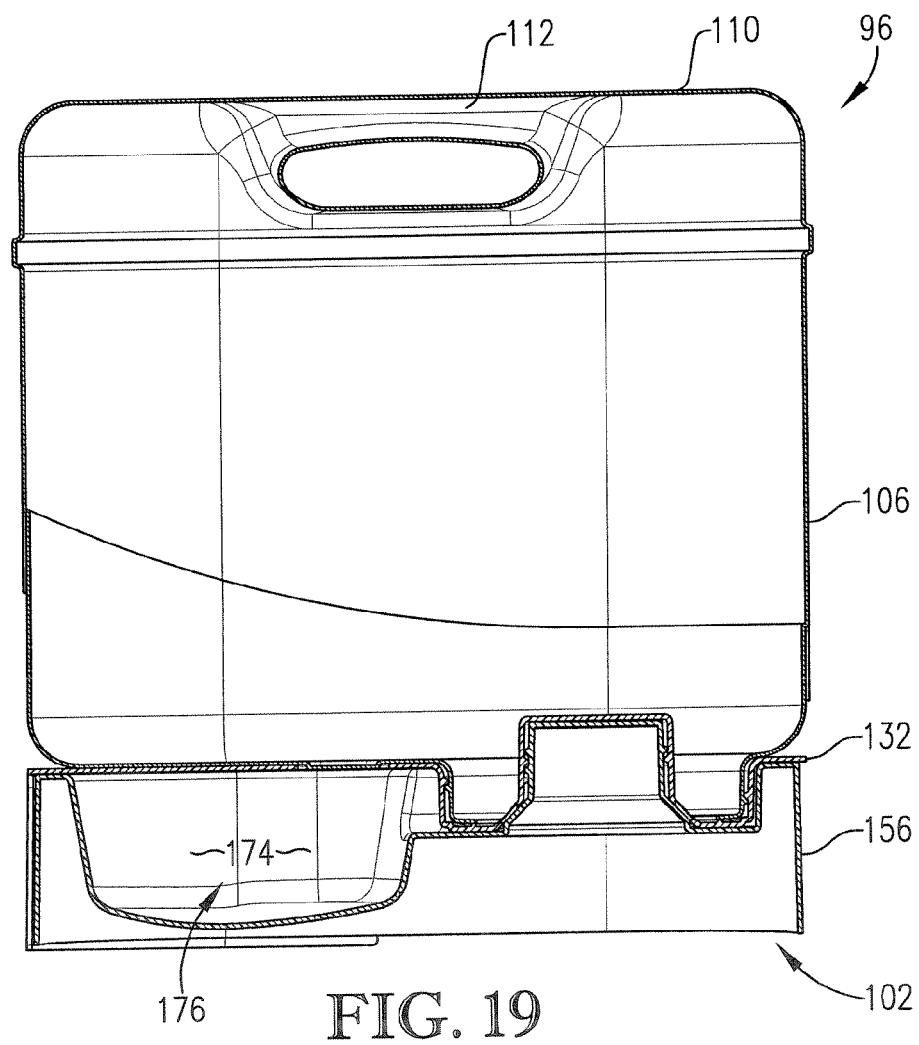
FIG. 19 is a vertical sectional view of the pet-watering device taken along line 19-19 of FIG. 18.
Figure 20:
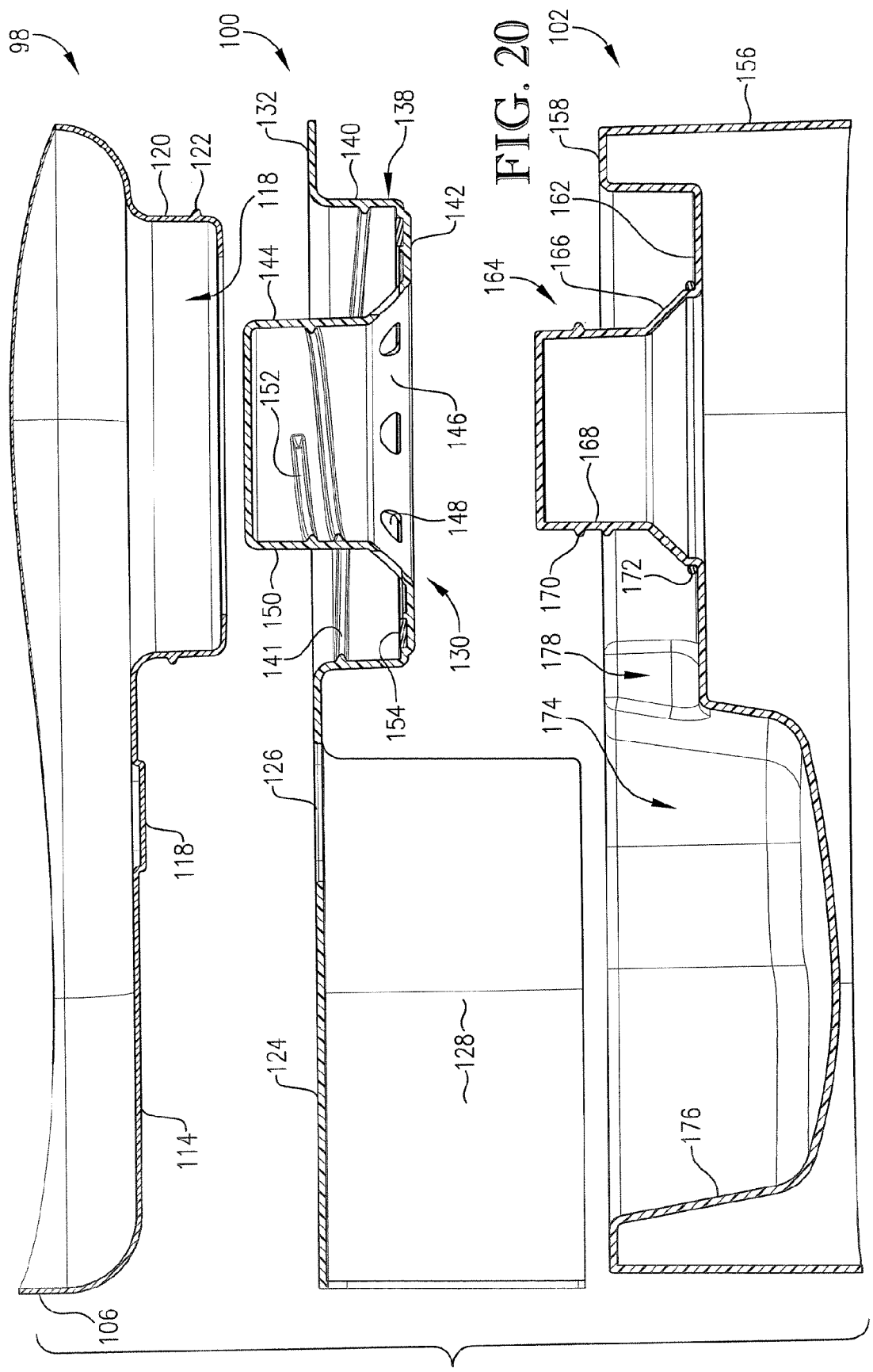
FIG. 20 is a fragmentary, vertical sectional, exploded view of the container, intermediate sealing element, and dish making up part of the pet-watering device depicted in FIG. 13.

The sealing device 100 is in the form of an intermediate component located between the underside of the bottom wall 114 and dish 102. Referring to FIGS. 16, 17, and 20, it will be seen that the device 100 includes a substantially flat plate 124 having an oval shaped slot 126 formed therein, and with a depending wall 128. The plate 124 supports an integral, annular head 130 having an endmost peripheral lip 132 with cutouts or spaces 134 and 136 between the ends of the lip 132 and the plate 124. A cup-shaped circular body 138 is provided between plate 124 and lip 132, and presents a downwardly extending circular sidewall 140 having a thread 141 on the inner face thereof, an annular base 142 having a groove in the upper face thereof, and an upstanding central circular extension 144. The extension 144 has a frustoconical, inwardly-extending bottom segment 146 with a series of circumferentially spaced openings 148 formed therein. A substantially circular, closed-top segment 150 extends upwardly from the segment 148 and has an interior thread 152 formed thereon. The sealing device 100 receives an annular, flat, resilient sealing ring 154 which seats within the grooved upper surface of base 142 as best seen in FIG. 20. Although not shown, the base 142 may be provided with a plurality of circumferentially spaced ears for retaining the sealing ring 154 within the groove. Preferably, the ears would be spaced about the inside circumference of the groove and each would have a reverse draft angle on the underside thereof that projects over the groove to grip the sealing ring 154 in place.

The sealing device 100 is secured to the bottom wall 114 by threading together the threads 122 and 141 on the outlet-defining tubular wall 120 and the inner face of wall 140, respectively. When appropriately threaded in this way, the slot 126 receives complemental detent 118, as illustrated in FIGS. 21 and 22.

The preferred dish 102 is integrally formed and includes a generally oval upstanding sidewall 156 forming the base of the dish, with a circumscribing top wall 158 interrupted by a finger pull 160. The finger pull 160 also serves as a spout for purposes which will be described. The upper wall 158 supports a resilient, up-and-down shiftable latching element 159 (see FIG. 16). The lefthand end of the dish 102, as viewed in FIG. 16, includes an intermediate slightly sloped wall 162 supporting an upstanding extension 164 substantially complemental with extension 144 of sealing device 100. Specifically, the extension 164 has a lowermost frustoconical inwardly-extending segment 166, as well as a substantially circular upstanding closed-top segment 168 having exterior threading 170. A thin resilient o-ring 172 is seated at the juncture between wall 162 and segment 166 as seen in FIG. 20. If desired, a semicircular groove (not shown) may be provided along the juncture between the wall 162 and segment 166, with the o-ring 172 being partly and snugly received within the groove to assuredly seat the o-ring 172 in the desired location.

The dish 102 further includes a water-holding cavity 174 formed by inwardly extending wall 176. A central passageway 178 is provided which establishes communication cavity 174 and the region above wall 162.

The dish 102 is secured to the sealing device 100 (and thereby the container 98 by threading together the exterior thread 170 on segment 168 and interior threading 152 provided on extension 150. Thus, the extension 154 is complementally received within the section 150. Moreover, the latching element 159 is received within cutout 134 of sealing device 100 to releasably lock the dish 102 relative to the container 98. It will thus be appreciated that the connection structure 104 for the device 96 comprises the interconnected extensions 150 and 164.

In order to fill the container 98 with water, it is necessary to remove the sealing device 100 and dish 102 from the compartment portion of the container 98. This is preferably done by inverting the device 96 and then removing the dish 102 from the sealing device 100 by depressing the latching element 159 and rotating the components relative to one another to unthread the segments 150 and 168. The detent 118 is then depressed out of the slot 126 so that the sealing device 100 can be unscrewed from the compartment portion of the container 98. Alternatively, filling of the container 98 can be accomplished by inverting the device 96 and simultaneously unthreading the device 100 and dish 102 as a unit from the container 98. During unthreading of these components, the detent 118 is forced out of slot 126 of plate 124, and the threading 122 of container 98 and 141 of device 100 are separated. This exposes the outlet 116 and allows easy filling of the container 98. Preferably, the threaded connections are oppositely inclined so that unthreading of the dish 34 from the sealing device 100 does not also cause the sealing device 100 to be unthreaded from the compartment portion of the container 100. Once the container 98 has been filed, the components are reconnected (e.g., the separated device 100 and dish 102 are rethreaded onto the tubular wall 120 until the detent 118 seats within slot 126). The now-complete device 96 can then be turned upright with the lower dish providing support for the entire device. In this orientation (see FIG. 21), the seals 154 and 172 prevent passage of water through the openings 148.

Figure 15:
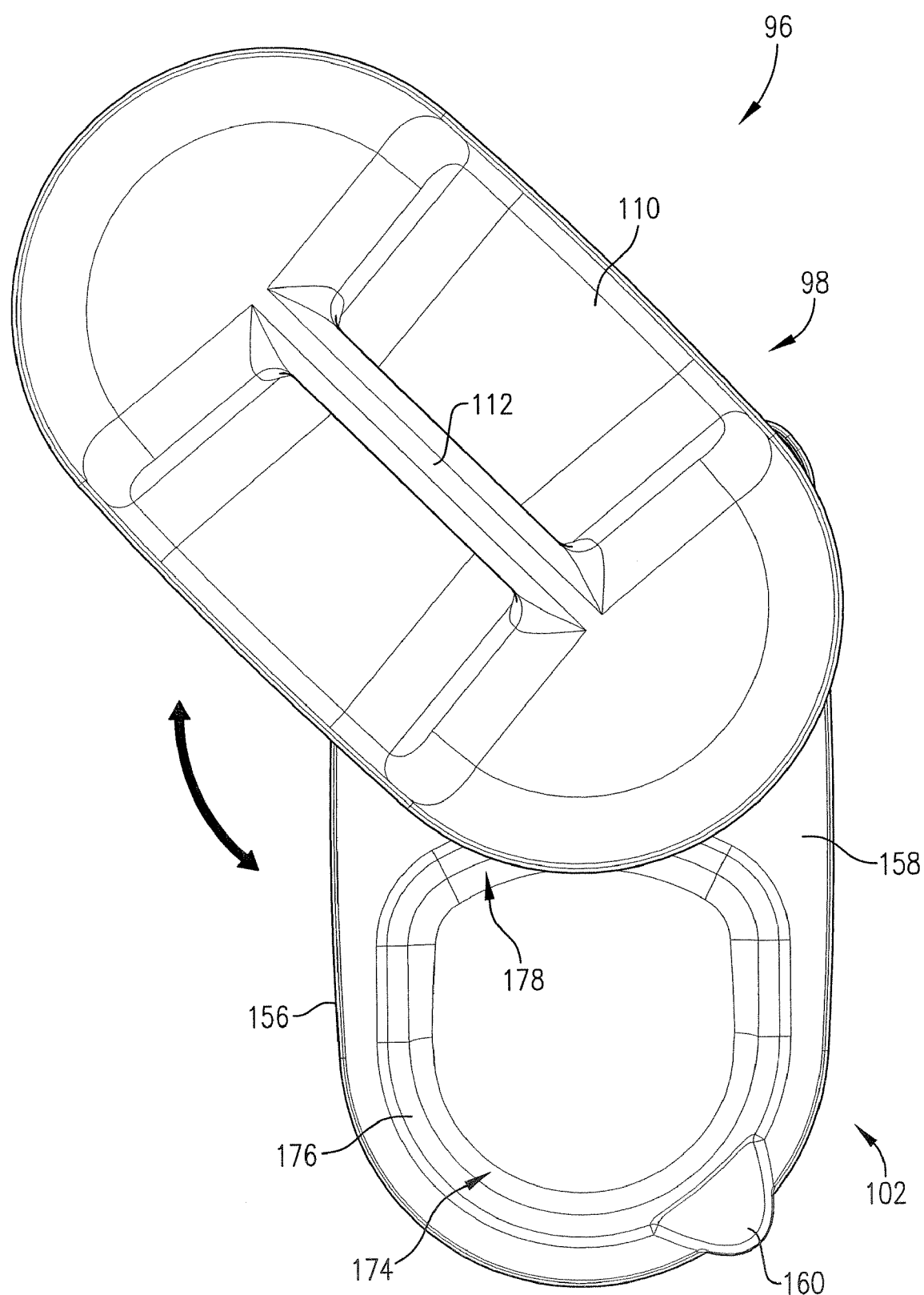
FIG. 15 is a plan view of the pet-watering device shown in FIG. 13.

When it is desired to use the device 96 for watering a pet, the friction latch 159 is manually depressed, and the dish 102 is swung relative to container 98 until the dish assumes the pet-watering position shown in FIGS. 13, 15, and 22. In this position, the latch 159 is received within cutout 136 to lock the dish in place. Turning to FIG. 22, it will be seen that rotation of the dish 102 relative to container 98 and device 100 causes a separation between plate 162 and base 142 of element 100, thereby permitting the flow of water through the openings 148 and into the region above plate 162. This water then flows through passageway 178 into cavity 174 where it may be accessed by a pet. When the pet is fully watered, the above dish rotation is reversed, until the device 96 again assumes its retracted position. Any remaining water in the dish 102 can be poured from the spout 160.

The structural components of the devices 30 and 96 are preferably fabricated from synthetic resin material, for reasons of cost, weight, and easy ability to be cleaned. A variety of synthetic resins may be used in this context, for example polyethylene. Conventional fabrication techniques such as injection molding can be used to manufacture these components. However, other suitable materials (e.g, metal, composites, etc.) and manufacturing techniques (other molding process, welding, etc.) are entirely within the ambit of the present invention.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby state his intent to rely on the Doctrine of Equivalents to determine and assess the reasonably fair scope of the present invention as pertains to any apparatus not materially departing from but outside the literal scope of the invention as set forth in the following claims.

What is claimed is:

1. A device for providing sustenance to a pet, said pet sustenance device comprising:
    an upright sustenance container presenting a sustenance storage chamber and a lower outlet opening communicating with the chamber; and
    a pet dish moveably coupled with said container,
    said dish being movable relative to the container between a retracted position where the dish is below the container and communication between the container outlet opening and the dish is prevented, and a pet-access position where the dish is moved outwardly relative to the container to establish communication between the container and dish and permit gravity-induced flow of sustenance from the container outlet opening and into the dish,
    said container adapted for holding water, with the container and dish cooperatively providing a water-tight seal therebetween when the dish is in the retracted position,
    said container including an upper compartment portion and an intermediate sealing device removably secured to the compartment portion,
    said compartment portion defining the sustenance storage chamber,
    said intermediate sealing device defining the lower outlet opening and cooperating with the dish to control communication between the storage chamber and dish,
    said dish and said intermediate sealing device being threadably interconnected, wherein the intermediate sealing device moves away from the dish as the dish moves from the retracted position to the pet-access position so as to permit communication between the storage chamber and the dish.

2. The pet sustenance device as claimed in claim 1, said intermediate sealing device defining a plurality of outlet openings.

3. The pet sustenance device as claimed in claim 1, said upper compartment portion being sloped adjacent said outlet opening.

4. The pet sustenance device as claimed in claim 1, said dish having a cavity offset from said outlet opening, said dish configured to facilitate flow of sustenance from the outlet opening into the cavity.

5. The pet sustenance device as claimed in claim 1, there being resilient seal structure carried by at least one of said container and dish for establishing the water-tight seal.

6. The pet sustenance device as claimed in claim 5, each of said container and dish carrying respective resilient seal structure.

7. The pet sustenance device as claimed in claim 1, said compartment portion and said intermediate sealing device being threadably interconnected.

8. The pet sustenance device as claimed in claim 7, said respective threaded interconnections being opposite in direction.

9. The pet sustenance device as claimed in claim 1, said dish having a base, said dish supporting said container with the dish base serving as a bottom of the device.

10. The pet sustenance device as claimed in claim 1, said container and dish each including upstanding external sidewalls, said container and dish sidewalls being in a mating relationship and cooperatively presenting a generally flush outer side surface when the dish is in the retracted position thereof.

11. A device for providing sustenance to a pet, said pet sustenance device comprising:
an upright sustenance container presenting a sustenance storage chamber and a lower outlet opening communicating with the chamber; and
a pet dish moveably coupled with said container and having a base,
said dish being moveable relative to the container between a retracted position where the dish is beneath the container and a pet-access position where the dish is moved outwardly relative to the container to permit a pet to consume the sustenance within the dish,
said dish supporting said container in both the retracted and pet-feeding positions, with said dish base serving as a bottom of the device,
said dish base presenting a lowermost support surface,
said container including an upper compartment portion and an upstanding leg,
said upper compartment portion defining the sustenance storage chamber,
said leg projecting downwardly from the upper compartment portion alongside the dish and terminating in vertical alignment with the support surface of the dish base to cooperate with the dish base in supporting the upper compartment portion,
said container and dish each including upstanding external sidewalls,
said container sidewall defining the upstanding leg.

12. The pet sustenance device as claimed in claim 11,
said leg being spaced from the dish base when the dish is in the pet-access position.

13. The pet sustenance device as claimed in claim 11,
said container and dish sidewalls being in mating relationship and cooperatively presenting a generally flush outer side surface when the when the dish is in the retracted position thereof.

14. The pet sustenance device as claimed in claim 11,
said container having wall structure defining the outlet opening,
said dish having tipper wall structure,
said wall structures of the container and dish serving to close communication between the container outlet and the dish when the dish is in the retracted position and permit gravity-induced flow of sustenance from the container outlet and into the dish when the dish is in the pet-access position.

15. The pet sustenance device as claimed in claim 11,
said container and dish having mating rotatably interfitted elements such that the dish swings relative to the container when moving between the retracted and pet-access positions.

16. A device for providing sustenance to a pet, said pet sustenance device comprising:
an upright sustenance container presenting a sustenance storage chamber and a lower outlet opening communicating with the chamber,
said container including a circumscribing external sidewall; and
a pet dish swingably coupled with the container and including an external sidewall,
said dish being swingable relative to the container between a retracted position where the dish is beneath the container and a pet-access position where the dish is swung outwardly relative to the container to permit a pet to consume the sustenance within the dish,
said container sidewall mating with the dish sidewall and cooperatively presenting a generally flush outer side surface when the dish is in the retracted position thereof,
said dish and container sidewalls presenting substantially vertically aligned portions when the dish is in the retracted position thereof,
said dish and container sidewalls presenting overlapping portions that extend alongside one another and are vertically offset relative to one another.

17. The pet sustenance device as claimed in claim 16,
said dish presenting a lowermost support surface,
said container including an upper compartment portion and an upstanding leg,
said upper compartment portion defining the sustenance storage chamber,
said leg projecting downwardly from the upper compartment portion alongside the dish and terminating in vertical alignment with the support surface to cooperate with the dish in supporting the upper compartment portion.

18. The pet sustenance device as claimed in claim 17,
said leg being spaced from the dish base when the dish is in the pet-access position.

19. A device for providing sustenance to a pet, said pet sustenance device comprising:
an upright sustenance container presenting a sustenance storage chamber and a lower outlet opening communicating with the chamber,
said container including a circumscribing external sidewall; and
a pet dish swingably coupled with the container and including an external sidewall,
said dish being swingable relative to the container between a retracted position where the dish is beneath the container and a pet-access position where the dish is swung outwardly relative to the container to permit a pet to consume the sustenance within the dish,
said container sidewall mating with the dish sidewall and cooperatively presenting a generally flush outer side surface when the dish is in the retracted position thereof,
said dish presenting a lowermost support surface,
said container including an upper compartment portion and an upstanding leg,
said upper compartment portion defining the sustenance storage chamber,
said leg projecting downwardly from the upper compartment portion alongside the dish and terminating in vertical alignment with the support surface to cooperate with the dish in supporting the upper compartment portion,
said container sidewall defining the upstanding leg.

20. The pet sustenance device as claimed in claim 19,
said container having wall structure defining the outlet opening,
said dish having upper wall structure,
said wall structures of the container and dish serving to close communication between the container outlet and the dish when the dish is in the retracted position and permit gravity-induced flow of sustenance from the container outlet and into the dish when the dish is in the pet-access position.

* * * * *